US012678997B2

(12) United States Patent
Sudre et al.

(10) Patent No.: US 12,678,997 B2
(45) Date of Patent: Jul. 14, 2026

(54) ADDITIVELY MANUFACTURED GRAPHITE TOOLING

(71) Applicant: Raytheon Technologies Corporation, Farmington, CT (US)

(72) Inventors: Olivier H. Sudre, Glastonbury, CT (US); Zachary Paul Konopaske, West Hartford, CT (US); Robin H. Fernandez, East Haddam, CT (US); Jesse R. Boyer, Middletown, CT (US); Afshin Bazshushtari, Rolling Hills Est, CA (US); Mary Colby, West Hartford, CT (US); Andrew Joseph Lazur, La Jolla, CA (US)

(73) Assignee: RTX Corporation, Farmington, CT (US)

( * ) Notice: Subject to any disclaimer, the term of this patent is extended or adjusted under 35 U.S.C. 154(b) by 390 days.

(21) Appl. No.: 18/200,174

(22) Filed: May 22, 2023

(65) Prior Publication Data

US 2024/0391134 A1 Nov. 28, 2024

(51) Int. Cl.
| | |
|---|---|
| *B28B 1/00* | (2006.01) |
| *B29C 64/165* | (2017.01) |
| *B33Y 10/00* | (2015.01) |
| *B33Y 40/20* | (2020.01) |
| *C01B 32/21* | (2017.01) |

(Continued)

(52) U.S. Cl.
CPC ............ *B28B 1/001* (2013.01); *B29C 64/165* (2017.08); *B33Y 10/00* (2014.12); *B33Y 40/20* (2020.01); *C01B 32/21* (2017.08); *C04B 35/62873* (2013.01); *C04B 35/83* (2013.01);

*C04B 2235/425* (2013.01); *C04B 2235/5248* (2013.01); *C04B 2235/5252* (2013.01)

(58) Field of Classification Search
CPC ..... B29C 64/118; B29C 64/165; B33Y 10/00; B33Y 40/00; B33Y 80/00; B28B 1/001
See application file for complete search history.

(56) References Cited

U.S. PATENT DOCUMENTS

| | | | |
|---|---|---|---|
| 5,775,402 A | 7/1998 | Sachs et al. | |
| 10,500,639 B2 * | 12/2019 | Yurko ..................... | C22C 25/00 |
| 10,759,090 B2 | 9/2020 | Gunner et al. | |

(Continued)

FOREIGN PATENT DOCUMENTS

| | | |
|---|---|---|
| CN | 115181959 A | 10/2022 |
| FR | 3084893 A1 | 2/2020 |

OTHER PUBLICATIONS

Liu et al.: Direct ink writing of chopped carbon fibers reinforced polymer-derived SiC composites with low shrinkage and high strength, Journal of the European Ceramic Society, vol. 43, Issue 2, 2023, pp. 235-244, ISSN 0955-2219. (Year: 2023).*

(Continued)

*Primary Examiner* — Nahida Sultana
(74) *Attorney, Agent, or Firm* — Kinney & Lange, P.A.

(57) ABSTRACT

A method of fabricating a tooling fixture suitable for use in infiltrating a fibrous preform includes generating a model of the tooling fixture, the model being conformal and complementary to a geometry of the fibrous preform, additively manufacturing the tooling fixture by extruding a carbon-containing ink in a layer-by-layer manner, and consolidating the extruded carbon-containing ink to form a consolidated tooling fixture.

18 Claims, 3 Drawing Sheets

(51) Int. Cl.
  C04B 35/628 (2006.01)
  C04B 35/83 (2006.01)

(56) References Cited

U.S. PATENT DOCUMENTS

| | | | |
|---|---|---|---|
| 10,814,564 B2 | 10/2020 | Hoyle et al. | |
| 2007/0117401 A1* | 5/2007 | Li | H01J 9/025 |
| | | | 438/758 |
| 2017/0209622 A1* | 7/2017 | Shah | C09D 11/102 |
| 2017/0297111 A1* | 10/2017 | Myerberg | B28B 1/001 |
| 2018/0346384 A1 | 12/2018 | Öttinger et al. | |
| 2020/0011190 A1* | 1/2020 | Read | C04B 35/83 |
| 2020/0159186 A1* | 5/2020 | King | B33Y 50/00 |
| 2021/0114110 A1* | 4/2021 | Sercombe | B28B 1/001 |
| 2021/0129429 A1* | 5/2021 | Long | B33Y 10/00 |
| 2022/0056161 A1* | 2/2022 | Moore | C08K 5/14 |
| 2024/0278507 A1* | 8/2024 | Lewicki | B29C 64/245 |

OTHER PUBLICATIONS

Extended European Search Report for EP Application No. 24175838.
2, dated Oct. 31, 2024, 9 pages.

* cited by examiner

112

110

ADDITIVELY MANUFACTURED GRAPHITE TOOLING

BACKGROUND

The present invention relates to the fabrication of ceramic matrix composites (CMCs), and more particularly to improved tooling for CMCs.

CMC parts are widely fabricated by densifying preforms made from woven fabrics or oriented fiber tows. Chemical vapor infiltration (CVI) is one of the most commonly used densification techniques practiced in industry. To keep the preforms in a rigid form and maintain proper shape and geometry, perforated tooling can be used to hold the preforms during the initial densification cycle(s). Holes on the tooling allow gaseous precursors to infiltrate into the preform for the deposition. Traditional tooling can be simply designed machined graphite blocks with uniform thicknesses and hole lengths. Such tooling can be difficult to tailor to complexly-shaped preforms, thus, a need exists for improved tooling.

SUMMARY

A method of fabricating a tooling fixture suitable for use in infiltrating a fibrous preform includes generating a model of the tooling fixture, the model being conformal and complementary to a geometry of the fibrous preform, additively manufacturing the tooling fixture by extruding a carbon-containing ink in a layer-by-layer manner, and consolidating the extruded carbon-containing ink to form a consolidated tooling fixture.

An additively manufactured tooling fixture suitable for use in infiltrating a fibrous preform includes a body comprising a consolidated carbon-containing ink. A geometry of the tooling fixture conforms to and complements a geometry of the fibrous preform.

Figure 1:
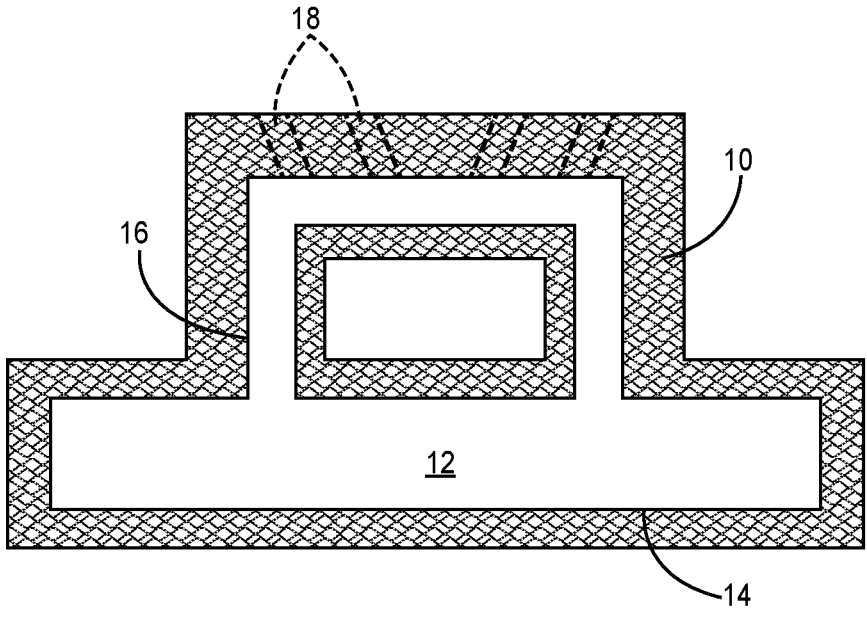
FIG. 1 is a simplified cross-sectional illustration of one embodiment of an additively manufactured graphite tooling fixture.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Figure 2:
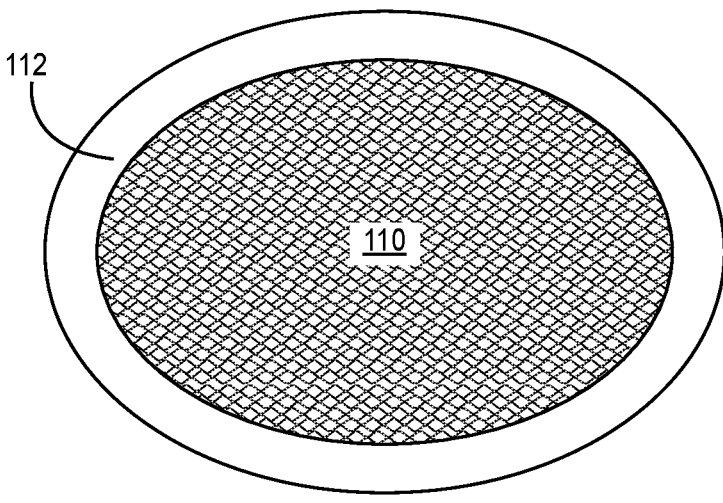
FIG. 2 is a simplified cross-sectional illustration of an alternative embodiment of an additively manufactured graphite tooling fixture.
Figure 3:
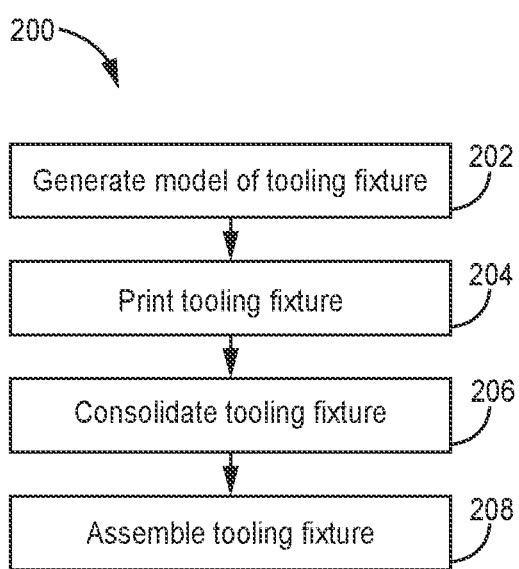
FIG. 3 is a flowchart illustrating select steps of a method for additively manufacturing a graphite tooling fixture.

This disclosure presents printed tooling fixtures for use with ceramic preforms and a method for additively manufacturing such tooling fixtures. FIGS. 1 and 2 are simplified cross-sectional illustrations of tooling fixtures 10 and 110 supporting preforms 12 and 112, respectively. FIG. 3 is a flowchart illustrating steps 202-208 of method 200 for fabricating tooling fixtures 10 and 110. FIGS. 1-3 are discussed together.

Preforms 12 and 112 can each be formed from tows of silicon carbide (SiC) fibers arranged in one of various two or three-dimensional woven architectures such as plain, harness (e.g., 3, 5, 8, etc.), twill, braid, or non-symmetric to name a few non-limiting examples. In an alternative embodiment, preforms 12 and/or 112 can be formed from non-woven (e.g., chopped, felted, etc.) fibers. As shown in FIG. 1, preform 12 includes a number of straight sides, and more specifically, planar portion 14 joined with hollow rectangular portion 16. variously disposed with respect to one another. In an exemplary embodiment, preform 12 can be used to fabricate an air seal assembly for a gas turbine engine. Other final CMC components with straight and/or planar features are contemplated herein. As shown in FIG. 2, preform 112 has a rounded geometry such that tooling fixture 110 is configured as a mandrel. In an exemplary embodiment, preform 112 can be used to fabricate an airfoil of a blade or vane for a gas turbine engine. Other final CMC components with curved features are contemplated herein.

With respect to preform 12, a traditionally manufactured tooling fixture might be shaped as a cube or rectangular cuboid sized to enclose preform 12. Accordingly, the geometry of such a tooling fixture would not necessarily conform to the exact geometry of preform 12. This can lead to a need to form more complicated tooling designs with variously sized infiltration holes in an effort to maintain uniform flow of gaseous precursors through the tooling fixture. With respect to preform 112, a traditionally manufactured mandrel can be difficult to sufficiently populate with infiltration holes sufficient to allow gaseous precursors to access the inner surface of preform 112 during CVI. Traditionally manufactured tooling fixtures can also be expensive with long lead times to fabricate. Accordingly, tooling fixtures 10 and 110 can each be tailored, using method 200, to optimize both strength and porosity, that is, the amount of open space through which gaseous precursors can diffuse, and made relatively quickly and inexpensively. The ability to create a conformal tooling fixture can further allow for more uniformity of the flow of gaseous precursors during CVI. Such conformal tooling fixtures can include straight and/or curved portions complementary to various preform geometries.

At step 202, a model of the tooling fixture to be fabricated can be generated. In some embodiments, the modeling program can include topology optimization to remove as much material as possible while maintaining the requisite mechanical and thermal properties. The model generated at step 202 will also consider (i.e., be based on) the geometry of the corresponding preform such that the printed tooling fixture has a conformal and complementary geometry to the preform.

At step 204, the tooling fixture can be additively manufactured according to the generated model. More specifically, the tooling fixture can be printed, in one embodiment, using an extrusion-type 3D printing technique (e.g., direct-ink-writing). In such an embodiment, graphite ink can be used to form a graphite tooling fixture having properties (e.g., coefficient of thermal expansion) similar to traditional machined graphite tooling fixtures. The ink can be extruded in a layer-by-layer manner to form the tooling fixture, or portion of the tooling fixture. In an alternative embodiment, a carbon-carbon composite tooling fixture can be printed with an ink containing a slurry of short carbon fibers. Other additively manufactured materials, such as silicon carbide, formed from a starting material containing silicon carbide powder, silicon powder, and a resin, are contemplated herein. In one embodiment, all or portions of the tooling fixture can be printed onto a build platform and assembled, after consolidation, around the preform. In an alternative embodiment, all or portions of the tooling fixture can be printed directly onto the preform itself to form a monolithic body.

At step 206, the printed ink can be graphitized/consolidated via heat treatment. For printed graphite, the resulting body can have a truss-type cellular organization forming a network of pores through which gaseous precursors can diffuse to reach the supported preform. The porosity can be optimized during the modeling step to achieve the ideal diffusion rate while being dense enough such that reactants do not deposit on/within the tooling fixture instead of the preform. In an alternative embodiment, the consolidated structure can resemble traditional tooling, with fairly dense solid portions, and infiltration holes, shown in dashed lines as holes 18 in FIG. 1, variously patterned throughout and extending through the thickness of the preform at their respective locations. Holes 18 in an additively manufactured tooling fixture can be formed with complex three-dimensional shapes hard to achieve with traditional machining processes.

At step 208, if not monolithically formed around/on the preform, the tooling fixture can be assembled around the preform. Assembly can include the use of clamps or mating features printed with the various segments to secure the tooling fixture in place. The enclosed/support preform can then undergo CVI to apply interface coating(s) (e.g., of boron nitride-BN) and/or infiltrate the preform with a ceramic (e.g., SiC) matrix to form the resulting CMC component.

A CMC component formed with the aid of any of the disclosed printed tooling fixtures can be incorporated into aerospace, maritime, or industrial equipment, to name a few, non-limiting examples.

Discussion of Possible Embodiments

The following are non-exclusive descriptions of possible embodiments of the present invention.

A method of fabricating a tooling fixture suitable for use in infiltrating a fibrous preform includes generating a model of the tooling fixture, the model being conformal and complementary to a geometry of the fibrous preform, additively manufacturing the tooling fixture by extruding a carbon-containing ink in a layer-by-layer manner, and consolidating the extruded carbon-containing ink to form a consolidated tooling fixture.

The method of the preceding paragraph can optionally include, additionally and/or alternatively, any one or more of the following features, configurations and/or additional steps:

In the above method, the step of generating the model can further include using topology optimization to reduce material of the tooling fixture.

In any of the above methods, the carbon-containing ink can include graphite.

In any of the above methods, a body of the consolidated tooling fixture can include a porous cellular network.

In any of the above methods, a body of the consolidated tooling fixture can include a plurality of infiltration holes.

In any of the above methods, the carbon-containing ink can include carbon fibers.

In any of the above methods, the step of additively manufacturing the tooling fixture can include three dimensionally printing the tooling fixture.

In any of the above methods, the step of three dimensionally printing the tooling fixture can include direct-ink-writing.

In any of the above methods, the step of three dimensionally printing the tooling fixture can include extruding the carbon-containing ink directly onto the fibrous preform.

In any of the above methods, the step of three dimensionally printing the tooling fixture can include extruding the carbon-containing ink onto a build platform.

Any of the above methods can further include after consolidating the extruded carbon-containing ink, assembling the consolidated tooling fixture around the fibrous preform.

An additively manufactured tooling fixture suitable for use in infiltrating a fibrous preform includes a body comprising a consolidated carbon-containing ink. A geometry of the tooling fixture conforms to and complements a geometry of the fibrous preform.

The tooling fixture of the preceding paragraph can optionally include, additionally and/or alternatively, any one or more of the following features, configurations and/or additional components:

In the above tooling fixture, the body can include graphite.

In any of the above tooling fixtures, the body can include a porous cellular network.

In any of the above tooling fixtures, the body can include a plurality of infiltration holes.

In any of the above tooling fixtures, the body can include a carbon-carbon composite material.

In any of the above tooling fixtures, at least a portion of the tooling fixture can be curved.

In any of the above tooling fixtures, at least a portion of the tooling fixture can be planar.

In any of the above tooling fixtures, the tooling fixture can include a monolithic body.

In any of the above tooling fixtures, the tooling fixture can be a mandrel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fabricating a tooling fixture suitable for use in infiltrating a fibrous preform, the method comprising:
   generating a model of the tooling fixture, the model being conformal and complementary to a geometry of the fibrous preform;
   additively manufacturing the tooling fixture by extruding a carbon-containing ink in a layer-by-layer manner to form a body having a porous cellular network and/or a plurality of infiltration holes; and
   consolidating, via heat treatment, the extruded carbon-containing ink to form a consolidated tooling fixture conformal and complementary to the geometry of the fibrous preform and comprising the porous cellular network and/or the plurality of infiltration holes.

2. The method of claim 1, wherein the step of generating the model further comprises using topology optimization to reduce material of the tooling fixture.

3. The method of claim 1, wherein the carbon-containing ink comprises graphite.

4. The method of claim 3, wherein the consolidated tooling fixture comprises the porous cellular network.

5. The method of claim 3, wherein the consolidated tooling fixture comprises the plurality of infiltration holes.

6. The method of claim 1, wherein the carbon-containing ink comprises carbon fibers.

7. The method of claim 1, wherein the step of additively manufacturing the tooling fixture comprises three dimensionally printing the tooling fixture.

8. The method of claim 7, wherein the step of three dimensionally printing the tooling fixture comprises direct-ink-writing.

9. The method of claim 1, wherein the step of three dimensionally printing the tooling fixture comprises extruding the carbon-containing ink directly onto an outer surface of the fibrous preform.

10. The method of claim 8, wherein the step of three dimensionally printing the tooling fixture comprises extruding the carbon-containing ink onto a build platform.

11. The method of claim 10, and further comprising: after consolidating the extruded carbon-containing ink, assembling the consolidated tooling fixture around the fibrous preform.

12. The method of claim 1, wherein the extruded carbon-containing ink is graphitized in the consolidation step.

13. A method of fabricating a tooling fixture suitable for use in infiltrating a fibrous preform, the method comprising:

generating a model of the tooling fixture, the model being conformal and complementary to a geometry of the fibrous preform;

additively manufacturing the tooling fixture by extruding a carbon-containing ink in a layer-by-layer manner to form a body having a porous cellular network and/or a plurality of infiltration holes; and consolidating the extruded carbon-containing ink to form a consolidated tooling fixture;

wherein the step of additively manufacturing the tooling fixture comprises three dimensionally printing the tooling fixture via direct-ink-writing; and wherein the step of three dimensionally printing the tooling fixture comprises extruding the carbon-containing ink directly onto the fibrous preform.

14. The method of claim 13 and further comprising: after consolidating the extruded carbon-containing ink, assembling the consolidated tooling fixture around the fibrous preform.

15. The method of claim 13, wherein the step of generating the model further comprises using topology optimization to reduce material of the tooling fixture.

16. The method of claim 13, wherein the carbon-containing ink comprises graphite.

17. The method of claim 13, wherein the consolidated tooling fixture comprises the porous cellular network.

18. The method of claim 13, wherein the consolidated tooling fixture comprises the plurality of infiltration holes.

* * * * *